United States Patent [19]

Dietrich

[11] Patent Number: 4,930,473
[45] Date of Patent: Jun. 5, 1990

[54] SWIRL CHAMBER AND SPARK PLUG ASSEMBLY

[75] Inventor: Rainer Dietrich, Celle, Fed. Rep. of Germany

[73] Assignee: Texas Ignitors Company, Inc., Houston, Tex.

[21] Appl. No.: 282,074

[22] Filed: Dec. 9, 1988

[51] Int. Cl.⁵ .............................................. F02B 19/08
[52] U.S. Cl. ............................. 123/266; 123/169 E L
[58] Field of Search ............... 123/262, 263, 266, 268, 123/282, 285, 293, 169 E L, 169 P A, 169 D B, 169 P H; 313/143

[56] References Cited

U.S. PATENT DOCUMENTS

| | | | |
|---|---|---|---|
| 4,176,649 | 12/1979 | Karlovitz | 123/263 |
| 4,242,990 | 1/1981 | Scherenberg et al. | 123/263 |
| 4,416,228 | 11/1983 | Benedikt et al. | 123/268 |
| 4,442,807 | 4/1984 | Latsch et al. | 123/254 |

Primary Examiner—Willis R. Wolfe
Assistant Examiner—M. Macy
Attorney, Agent, or Firm—Neal J. Mosely

[57] ABSTRACT

A swirl chamber and spark plug assembly comprises a unitary generally cup-shaped cylindrical member having external threads for removably installing it in the spark plug receiving hole of an internal combustion engine and a reduced diameter lower portion at the opposite end. The interior of the swirl chamber member has a central bore with internal threads at the top end and a stepped cylindrical swirl chamber defined by a lower cylindrical chamber and an upper cylindrical chamber of larger diameter for swirling gas in relation thereto. A spark plug having elongated electrodes is threadedly received in the top end of the swirl chamber with the spark plug gap at the juncture between the upper and lower chambers. A series of circumferentially-spaced, small-diameter orifices at the bottom of the lower chamber extend angularly inward and upward through the side wall of the swirl chamber body tangent to the side wall of the lower chamber and a small diameter central orifice extends axially through the bottom wall for drawing a fuel-air mixture into the stepped swirl chamber and injecting flames from the swirl chamber interior into the engine combustion chamber. When received in the spark plug hole of the engine, the reduced diameter portion of the swirl chamber protrudes slightly into the engine combustion chamber to expose the orifices for maximum fuel-air mixture and flame communication with the engine combustion chamber.

16 Claims, 1 Drawing Sheet

SWIRL CHAMBER AND SPARK PLUG ASSEMBLY

BACKGROUND OF THE INVENTION

1. Field of the Invention

This invention relates generally to ignition devices, and, and more particularly to a swirl chamber and spark plug assembly which carries a spark plug having an extended firing end and has apertures at the lower end which impart swirling action to the fuel-air mixture and generates torch jets for rapid and uniform energy conversion in the engine combustion chamber.

2. Brief Description of the Prior Art

There are several patents which disclose various auxiliary combustion chambers and modified spark plug devices provided by others in attempts to overcome the deficiencies of the conventional spark plug arrangement in internal combustion engines.

The U.S. Patents to Browning (2,100,320), Pielstick (2,677,356), Goto (4,071,001), and Noguchi et al (4,127,095), disclose precombustion chamber devices wherein the lower portion of the chamber below the firing end of the spark plug is partitioned into parallel spaces or provided with a center core or divider having vertical and radial walls which act as fuel passage channels. These types of precombustion chambers do not utilize a centrifugal or helical swirling action for the fuel-air mixture.

The U.S. Patents to Benedikt et al (4,416,228), Bamer et al (4,465,031), and Breuser et al (4,509,476) disclose precombustion chamber devices which impart a whirling or twisting action to the fuel-air mixture, but the wall of the combustion chamber cooperates with the spark plug electrode to form the spark gap. These devices do not suggest the use of a spark plug having an elongated firing end wherein the electrode gap is extended into the area just above the lower chamber.

Flores, U.S. Pat. No. 4,499,399 discloses a spark plug adapter wherein an upper chamber encompasses the spark plug electrodes and communicates with a lower chamber through an acceleration orifice and a transverse deflector imparts turbulence to the combustion products. Flores does not utilize a centrifugal or helical swirling action for the fuel-air mixture, nor a spark plug having an elongated firing end.

Blais, U.S. Pat. No. 4,542,724 discloses a flame injector sleeve that receives a conventional spark plug within a chamber having a forward end which has a frusto-conical interior surface with a bottom aperture and five holes through the side wall which are tapered upwardly at a clockwise angle and inwardly at thirty degrees relative to the side wall. Blais does not suggest the use of a spark plug having an elongated firing end wherein the electrode gap is extended into the area just above the holes.

The present invention is distinguished over the prior art in general, and these patents in particular by a swirl chamber and spark plug assembly comprising a unitary cup-shaped swirl chamber member having external threads for removably installing it in the spark plug receiving hole of an internal combustion engine and a reduced diameter lower portion at the opposite end. The interior of the swirl chamber has a central bore with internal threads at the top end and a stepped cylindrical swirl chamber defined by a lower cylindrical chamber and an upper cylindrical chamber of larger diameter for swirling gas in relation thereto. A spark plug having elongated electrodes is threadedly received in the top end of the swirl chamber with the spark plug gap at the juncture between the upper and lower chambers. A series of circumferentially spaced small diameter orifices at the bottom of the lower chamber extend angularly inward and upward through the side wall of the swirl chamber body tangent to the side wall of the lower chamber and a small diameter central orifice extends axially through the bottom wall for drawing a fuel-air mixture into the stepped swirl chamber and injecting flames from the swirl chamber interior into the engine combustion chamber. When received in the spark plug hole of the engine, the reduced diameter portion of the swirl chamber protrudes slightly into the engine combustion chamber to expose the orifices for maximum fuel-air mixture and flame communication with the engine combustion chamber.

SUMMARY OF THE INVENTION

It is therefore an object of the present invention to provide a swirl chamber and spark plug assembly which improves the energy conversion process in lean burning, spark ignited, internal gas combustion engines by rapidly and uniformly igniting the non-homogeneous fuel-air mixture.

It is another object of this invention to provide a swirl chamber and spark plug assembly which will lower the fuel consumption and reduce exhaust emissions of internal combustion engines.

Another object of this invention is to provide a swirl chamber and spark plug assembly which will reduce combustion pressure fluctuations and speed variations in internal combustion engines and lower the engine torque.

Another object of this invention is to provide a swirl chamber and spark plug assembly which ignite leaner fuels.

Another object of this invention is to provide a swirl chamber and spark plug assembly which will operate efficiently at lower ignition voltage.

Another object of this invention is to provide a swirl chamber and spark plug assembly which utilizes a two-step chamber configuration and locates the spark plug gap inside the chamber such that ionization across the spark occurs at the location where there is an optimum fuel-air mixture.

A further object of this invention is to provide a swirl chamber and spark plug assembly which allows the spark plug to be easily and quickly unscrewed from the swirl chamber whereby its electrodes can be inspected or reset as required.

A still further object of this invention is to provide a swirl chamber and spark plug assembly which is simple in construction, economical to manufacture, and is long lasting, rugged, and dependable in use.

Other objects of the invention will become apparent from time to time throughout the specification and claims as hereinafter related.

The above noted objects and other objects of the invention are accomplished by a swirl chamber and spark plug assembly comprising a unitary cup-shaped swirl chamber member having external threads for removably installing it in the spark plug receiving hole of an internal combustion engine and a reduced diameter lower portion at the opposite end. The interior of the swirl chamber has a central bore with internal threads at the top end and a stepped cylindrical swirl chamber defined by a lower cylindrical chamber and an upper cylindrical chamber of larger diameter for swirling gas in relation thereto. A spark plug having elongated electrodes is threadedly received in the top end of the swirl chamber with the spark plug gap at the juncture between the upper and lower chambers. A series of circumferentially spaced small diameter orifices at the bottom of the lower chamber extend angularly inward and upward through the side wall of the swirl chamber body tangent to the side wall of the lower chamber and a small diameter central orifice extends axially through the bottom wall for drawing a fuel-air mixture into the stepped swirl chamber and injecting flames from the swirl chamber interior into the engine combustion chamber. When received in the spark plug hole of the engine, the reduced diameter portion of the swirl chamber protrudes slightly into the engine combustion chamber to expose the orifices for maximum fuel-air mixture and flame communication with the engine combustion chamber.

The orifices tangent to the lower chamber side wall extend at an inward and upward angle relative to the horizontal axis and have a diameter relative to the diameter of said central orifice such that the fuel-air mixture is forced through the orifices into the interior of the lower chamber in the compression stroke of the engine and that portion of the mixture coming in straight from said central orifice will move as a straight stream up toward the electrodes of the spark plug and the portion entering through the tangential orifices will swirl helically upward toward said upper chamber.

The diameter of the lower chamber relative to the upper chamber is such that the fuel component of the swirling mixture is subjected to increased centrifugal forces acting on it as it moves along the wall of the lower chamber sufficient to form a spiral boundary layer where fine turbulences ensure optimum mixing of the fuel and air and the swirling mixture moving spirally toward the gap of the spark plug has especially small fluctuations in flow velocity, composition, and temperature.

The swirling mixture upon entering the larger diameter upper chamber are subjected to a sharp drop in velocity at the wall of the upper chamber to provide optimum ignition conditions where the ionization across the spark gap occurs. The fuel-air mixture being forced through the central orifice reduces the axial component of flow at the interior wall of the upper chamber sufficient to displace residual gases from the vicinity of spark position to provide a fuel-air mixture at the wall of the lower chamber wall near the spark position which is richer relative to the fuel-air mixture in the compression chamber of the engine.

Upon firing of the spark plug during the compression stroke, the fuel-air mixture becomes ignited causing a spiral flame front of high velocity substantially proportional to engine speed in a spiral direction outward from the spark plug gap toward the axis of the chamber while the flame origin remains in the vicinity of the spark and the resultant combustion increases the pressure within the swirl chamber to a level above that in the engine combustion chamber such that the burning mixture shoots spikes of flames out of the orifices to ignite the compressed fuel-air mixture therein.

DESCRIPTION OF THE PREFERRED EMBODIMENT

Figure 1:
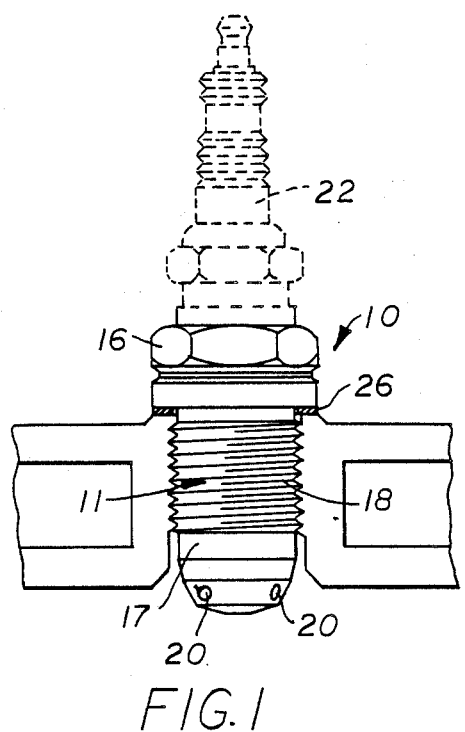
FIG. 1 is a side elevation of the swirl chamber and spark plug assembly in accordance with the present invention seated in the spark plug hole of an internal combustion engine.
Figure 2:
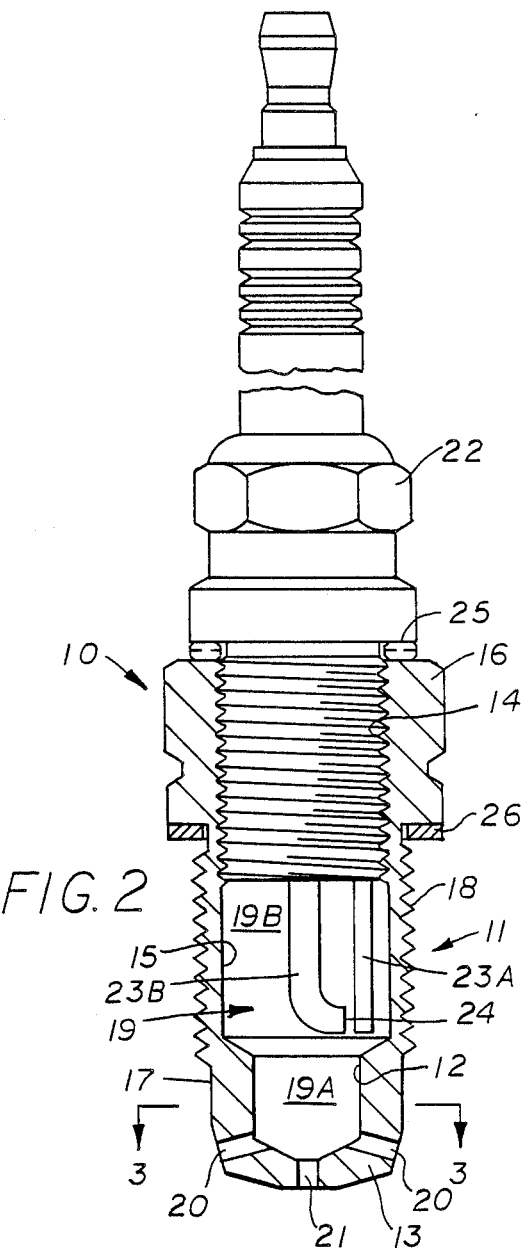
FIG. 2 is an enlarged side elevation, in partial cross section, of the swirl chamber and spark plug assembly.
Figure 3:
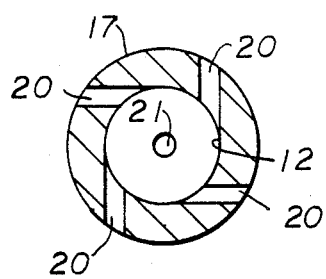
FIG. 3 is a transverse cross section of the lower portion of the swirl chamber and spark plug assembly.

Referring to the drawings by numerals of reference, there is shown in FIGS. 1, 2, and 3, a preferred swirl chamber for spark plugs 10. The swirl chamber member 10 comprises a generally cylindrical body 11 having a central interior bore 12 terminating at a bottom wall 13 at one end, an internally threaded portion 14 at the opposite end, and a counterbored portion 15 extending between bore 12 and threaded portion 14. The exterior top portion of swirl chamber 10 has a hexagonal flange portion 16 surrounding the internally threaded portion 14, a reduced diameter portion 17 at the opposite end, and exterior threads 18 extending between flanged portion 16 and reduced diameter portion 17. The exterior threads 18 threadedly seat the body 11 in the threaded spark plug receiving hole of an internal combustion engine.

The interior bore 12 and the counterbore 15 form a two-step extended cylindrical swirl chamber 19 with the bore 12 defining a lower reduced diameter chamber 19A and the counterbore 15 defining an upper chamber 19B of larger diameter. The body 11 is formed of a unitary heat resistive material such as nickel alloy or inconel.

A series of four circumferentially spaced small diameter orifices 20 at the bottom of the lower chamber 19A extend angularly inward and upward through the side wall of the body 11 tangent to the side wall of the chamber 19A. For purposes of illustration, the orifices 20 are shown out of position in FIG. 2, but in their true orientation in FIG. 3. Another small diameter central orifice 21 extends axially through the bottom wall 13. The preferred number of orifices is four tangential orifices 20 and one central orifice 21 for optimum swirling effect of the fuel-air mixture and flame injection from the swirl chamber interior into the engine combustion chamber as explained hereinafter.

As seen in FIG. 2, the interior threaded portion 14 threadedly receives a specially designed spark plug 22 having an extended firing end with elongate electrodes 23A and 23B. The laterally spaced electrodes 23A and 23B of the spark plug 22 extend longitudinally through the upper chamber 19B and terminate with the gap portion 24 at the juncture of the upper chamber 19B with the lower chamber 19A.

The outer ground electrode 23A extends downwardly beyond the threaded portion of the spark plug closely adjacent and parallel to the interior wall of the upper chamber 19B and the center electrode 23B extends centrally beyond the threaded portion of the spark plug and its lower end is bent outwardly to terminate near the bottom end of the electrode 23A to place the gap 24 close to the wall of the upper chamber 19B.

The two-step chamber configuration (19A and 19B) and the location of the spark plug gap 24 inside the chamber 19 places the point at which ionization across the spark gap occurs at the location where there is an optimum fuel-air mixture. The spark plug 22 may be unscrewed from the swirl chamber 10 and its electrodes 23A and 23B can be inspected or reset as required.

The construction of the spark plug is such that it allows maximum heat transfer and the projection of the electrodes leave sufficient room in the upper swirl chamber 19B for residual gases of the prior combustion cycle to stay clear from the electrode gap 24 where the ionization occurs. Because of the extended electrode design, the ceramic insulator nose of the spark plug has minimum exposure to the firing inside of the swirl chamber, thus keeping the spark plug "cool" and providing a high heat transfer rate.

Only one heat range is necessary for the spark plug used in the swirl chamber because the external main combustion heat is uniformly disposed via the swirl chamber itself and has no bearing on the internal combustion. The electrodes 23 are preferably made of nickel, but other materials such as platinum, iridium, and stainless steel, may be used. Copper cores may also be used in the spark plug for enhanced internal electrode heat dissipation.

A conventional spark plug gasket 25 is provided between the bottom of the flange of the spark plug 22 and the top surface of the flanged portion 16 of the swirl chamber body 11, and a metal gasket 26 is provided between the bottom of the flange 16 and the top of the threaded portion 18 of the body 11 to releasably seal the swirl chamber body in the spark plug receiving hole of the engine. The reduced diameter end 17 of the swirl chamber body 11 protrudes slightly into the engine combustion chamber such that the orifices 20 and 21 are exposed for maximum fuel-air mixture and flame communication with the engine combustion chamber.

OPERATION

In use, the spark plug ignition swirl chamber is threadedly installed in the spark plug hole of the internal combustion engine and the specially designed spark plug is installed in the internally threaded end of the swirl chamber. It should be understood that the swirl chamber may also be installed on the firing end of the spark plug and the assembly installed in the spark plug hole as a single unit.

In the compression stroke of the engine, a mixture of fuel and air is forced through the orifices 20 and 21 into the interior of the lower chamber 19A. That portion of the mixture coming in straight from the central orifice 21 will move as a straight stream up toward the electrodes 24 and the portion entering through the four tangential orifices 20 will swirl helically upward toward the upper chamber 19B. The tangential orifices 20 average the mixture flowing into the lower chamber 19B.

The fuel component of the swirling mixture constitutes a heavier phase that, due to increased centrifugal forces acting on it, moves along the walls of the lower chamber 19B and forms a spiral boundary layer where fine turbulences ensure good mixing. The swirling mixture moving spirally toward the gap 24 of the spark plug has especially small fluctuations in flow velocity, composition, and temperature. When the swirling mixture enters the larger diameter upper chamber 19B, there is a sharp drop in velocity at the chamber wall 15 which provides exceptionally good ignition conditions where the ionization across the spark gap occurs.

The fuel-air mixture being forced through the central orifice 21 reduces the axial component of flow at the interior wall 15 and displaces residual gases from the vicinity of spark position. Because of the high centrifugal forces (greater than 1000 ×acceleration relative to gravity), a richer mixture will result at the wall 15 and near the spark position, particularly with a non-homogeneous mixture.

The spark plug fires just before the piston reaches the upper limit of its travel. The spark ignites the fuel, causing a flame front to move outward from the gap 24. This combustion greatly increases the pressure inside the spark plug/swirl chamber assembly which rises to a level above that in the engine combustion chamber, and the burning mixture shoots five spikes or "blowtorches" out of the orifices 20 and 21, effectively igniting the compressed fuel-air mixture therein.

After ignition of the mixture inside the swirl chamber, the swirl becomes the combustion carrier due to the geometric design of the chamber. Thus, the combustion initiation phase proceeds much faster and more uniformly, as well as virtually synchronous with engine speed. There is a spiral flame front of high velocity proportional to engine speed in a spiral direction toward the axis of the chamber 19. At the same time, the flame origin remains in the vicinity of the spark.

Figure 4:
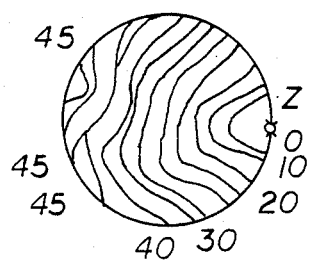
FIG. 4 is a schematic to plan view illustrating the spark plug ignition process without a swirl chamber.
Figure 5:
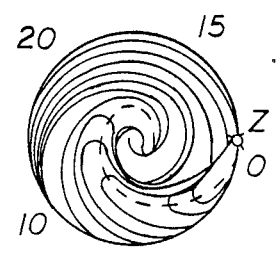
FIG. 5 is a schematic top plan view illustrating the spark plug ignition process utilizing a swirl chamber in accordance with the present invention.

As illustrated in FIG. 4, in the ignition process without a swirling action, only about 10% of the cross-sectional area of the fuel-air mixture has been reached by the flame after 10 milliseconds. As seen in FIG. 5, the swirling action increases this figure to 75% in the same time frame.

After ignition, the flame front separates from the cool wall 15 and circumferentially surrounds the stream from the central orifice 21 in the transition area between the small diameter lower chamber 19A and the larger diameter upper chamber 19B. The extremely rapid expansion of burned fuel-air mixture and the corresponding pressure from the temperature increase give rapid flame front acceleration to the orifices 20 and 21 and thus to the engine combustion chamber. The result is a complete conversion of the chemical energy in the swirl chamber as the burning mixture is divided into powerful ignition blowtorches.

The efficiency of this energy conversion process is increased by providing a spark plug having an extended firing end with a relatively hot center electrode.

While this invention has been described fully and completely with special emphasis upon a preferred embodiment, it should be understood that within the scope of the appended claims the invention may be practiced otherwise than as specifically described herein.

I claim:

1. A spark plug and swirl chamber assembly comprising;
   a spark plug having an extended externally threaded firing end and axially extending elongate electrodes which extend beyond the externally threaded portion and terminate in a spark gap,
   a generally cup-shaped spark plug swirl chamber member having internal threads at one end threadedly and releasably engaged on the threaded portion of said spark plug and a central interior bore extending axially therefrom and terminating in a bottom wall vertically spaced from said spark gap,
   said swirl chamber member interior bore having a cylindrical portion of a first diameter at the end terminating in a bottom wall and a second cylindrical portion of a second diameter larger than the first extending axially between the first cylindrical portion and the internally threaded portion, said first cylindrical portion and said second cylindrical portion defining a longitudinally stepped cylindrical swirl chamber having a lower chamber and an upper chamber of larger diameter for swirling gas in relation thereto, and a plurality of circumferentially spaced small diameter orifices at the bottom of said lower chamber extending angularly inward and upward through the swirl chamber member side wall and open tangentially into said lower chamber and a small diameter central orifice not larger than said sidewall orifices extending axially through said bottom wall for drawing a fuel-air mixture into said stepped swirl chamber and injecting flames from said stepped swirl chamber into the engine combustion chamber, the outer surface of said swirl chamber member having a radially flanged top portion, a reduced diameter lower portion at the opposite end, and exterior threads extending between the flanged portion and reduced diameter portion for threadedly seating said swirl chamber member in the threaded spark plug receiving hole of an internal combustion engine, said spark plug elongate electrodes extending longitudinally through said upper chamber and terminating with their gap portion in said upper chamber at the juncture of said upper chamber with said lower chamber, and said body threadedly received in the spark plug hole of the engine whereby the reduced diameter portion of said body protrudes slightly into the engine combustion chamber and said orifices are exposed for maximum fuel-air mixture and flame communication with the engine combustion chamber.

2. A spark plug and swirl chamber assembly according to claim 1 wherein
there are four of said tangential orifices.

3. A spark plug and swirl chamber assembly according to claim 1 in which;
said spark plug electrodes are of platinum.

4. A spark plug and swirl chamber assembly according to claim 1 in which;
said spark plug electrodes are of nickel.

5. A spark plug and swirl chamber assembly according to claim 1 in which;
said spark plug electrodes are of iridium.

6. A spark plug and swirl chamber assembly according to claim 1 in which;
said spark plug electrodes are of stainless steel.

7. A spark plug and swirl chamber assembly according to claim 1 in which;
said spark plug electrodes have copper cores.

8. A spark plug and swirl chamber assembly according to claim 1 in which;
said circumferentially spaced orifices tangent to said lower chamber side wall extend at an inward and upward angle relative to the horizontal axis and have a diameter relative to the diameter of said central orifice such that a fuel-air mixture is forced through said orifices into the interior of the lower chamber in the compression stroke of the engine and that portion of the mixture coming in straight from said central orifice will move as a straight stream up toward the electrodes of the spark plug and the portion entering through said tangential orifices will swirl helically upward toward said upper chamber, and the diameter of said lower chamber relative to said upper chamber is such that the fuel component of the swirling mixture is subjected to increased centrifugal forces acting on it as it moves along the wall of said lower chamber sufficient to form a spiral boundary layer where fine turbulences ensure optimum mixing of the fuel and air and the swirling mixture moving spirally toward the gap of the spark plug has especially small fluctuations in flow velocity, composition, and temperature and the swirling mixture upon entering said larger diameter upper chamber being subjected to a sharp drop in velocity at the wall of said upper chamber to provide optimum ignition conditions where the ionization across the spark gap occurs, and the fuel-air mixture being forced through said central orifice reducing the axial component of flow at the interior wall of said upper chamber sufficient to displace residual gases from the vicinity of spark position to provide a fuel-air mixture at the wall of said lower chamber wall near the spark position which is richer relative to the fuel-air mixture in the compression chamber of the engine.

9. A spark plug and swirl chamber assembly according to claim 8 in which;
the fuel-air mixture becomes ignited upon firing of the spark plug during the compression stroke of the engine causing a spiral flame front of high velocity substantially proportional to engine speed in a spiral direction outward from the spark plug gap toward the axis of the chamber while the flame origin remains in the vicinity of the spark and the resultant combustion increases the pressure within said swirl chamber to a level above that in the engine combustion chamber such that the burning mixture shoots spikes of flames out of said orifices to ignite the compressed fuel-air mixture therein.

10. An ignition swirl chamber for spark plugs comprising;
a generally cylindrical unitary body formed of heat resistive material having axial upper and lower portions, a central interior bore, a bottom wall, a side wall, and an outer surface, said outer surface having an enlarged diameter top portion, a reduced diameter lower portion, and exterior threads extending between the top and lower portions for threadedly seating said body in the threaded spark plug receiving hole of an internal combustion engine, said interior bore having an internally threaded top end adapted to threadedly receive a park plug, a cylindrical portion of a first diameter terminating at said bottom wall, and a second cylindrical portion of larger diameter extending axially between the first cylindrical portion and the internally threaded portion, said first and said second cylindrical portions defining a longitudinally stepped cylindrical swirl chamber having a lower chamber and an upper chamber of larger diameter for swirling gas in relation thereto, and a plurality of circumferentially-spaced, small-diameter orifices at the bottom of said lower chamber extending angularly inward and upward through said side wall of said body opening tangentially into said lower chamber and a small diameter central orifice extending axially through said bottom wall for drawing a fuel-air mixture into said stepped swirl chamber and injecting flames from said stepped swirl chamber into the engine combustion chamber, said body being adapted to be threadedly received in the spark plug hole of the engine whereby the reduced diameter portion of said body protrudes slightly into the engine combustion chamber and said orifices are exposed for maximum fuel-air mixture and flame communication with the engine combustion chamber, a spark plug having an extended firing end with elongate electrodes which extend longitudinally through said upper chamber and terminate with their gap portion at the juncture of said upper chamber with said lower chamber, said spark plug having a ground electrode adjacent to the wall of said upper chamber and a center electrode bent outward to provide a spark gap adjacent said upper chamber wall.

11. An ignition swirl chamber according to claim 10 wherein
there are four of said tangential orifices.

12. An ignition swirl chamber according to claim 10 in which;
said spark plug electrodes are of platinum.

13. An ignition swirl chamber according to claim 10 in which;
said spark plug electrodes are of nickel.

14. An ignition swirl chamber according to claim 10 in which;
said spark plug electrodes are of iridium.

15. An ignition swirl chamber according to claim 10 in which;
said spark plug electrodes are of stainless steel.

16. An ignition swirl chamber according to claim 10 in which;
said spark plug electrode has a copper core.

* * * * *